Oct. 7, 1952 — A. E. WEIGELE — 2,612,871
FLUID PRESSURE-OPERATED PISTON ASSEMBLY
Original Filed April 11, 1945 — 5 Sheets-Sheet 1
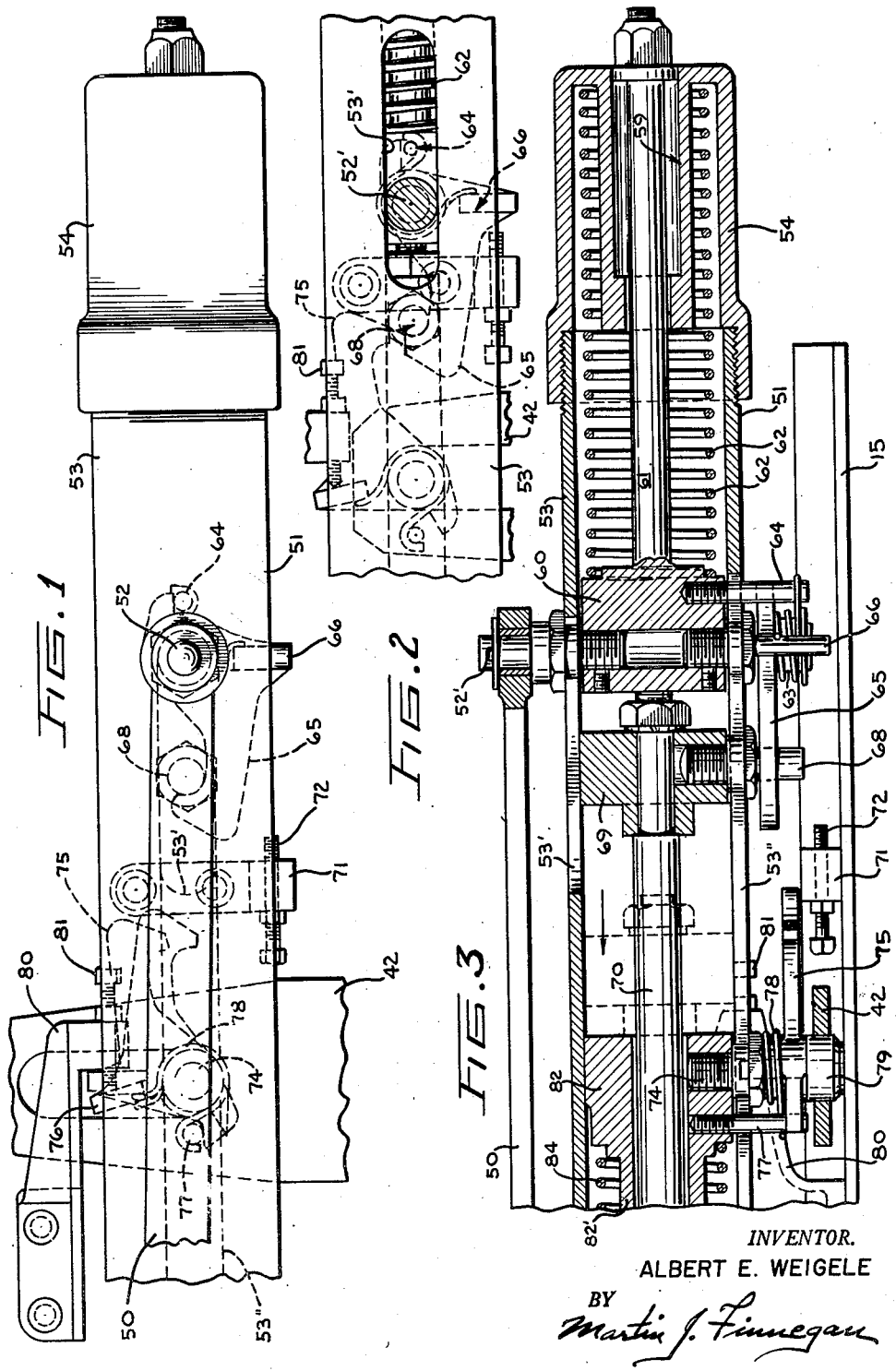
INVENTOR.
ALBERT E. WEIGELE
BY Martin J. Finnegan
ATTORNEY Oct. 7, 1952 — A. E. WEIGELE — 2,612,871
FLUID PRESSURE-OPERATED PISTON ASSEMBLY
Original Filed April 11, 1945 — 5 Sheets-Sheet 2

INVENTOR.
ALBERT E. WEIGELE
BY Martin J. Finnegan
ATTORNEY

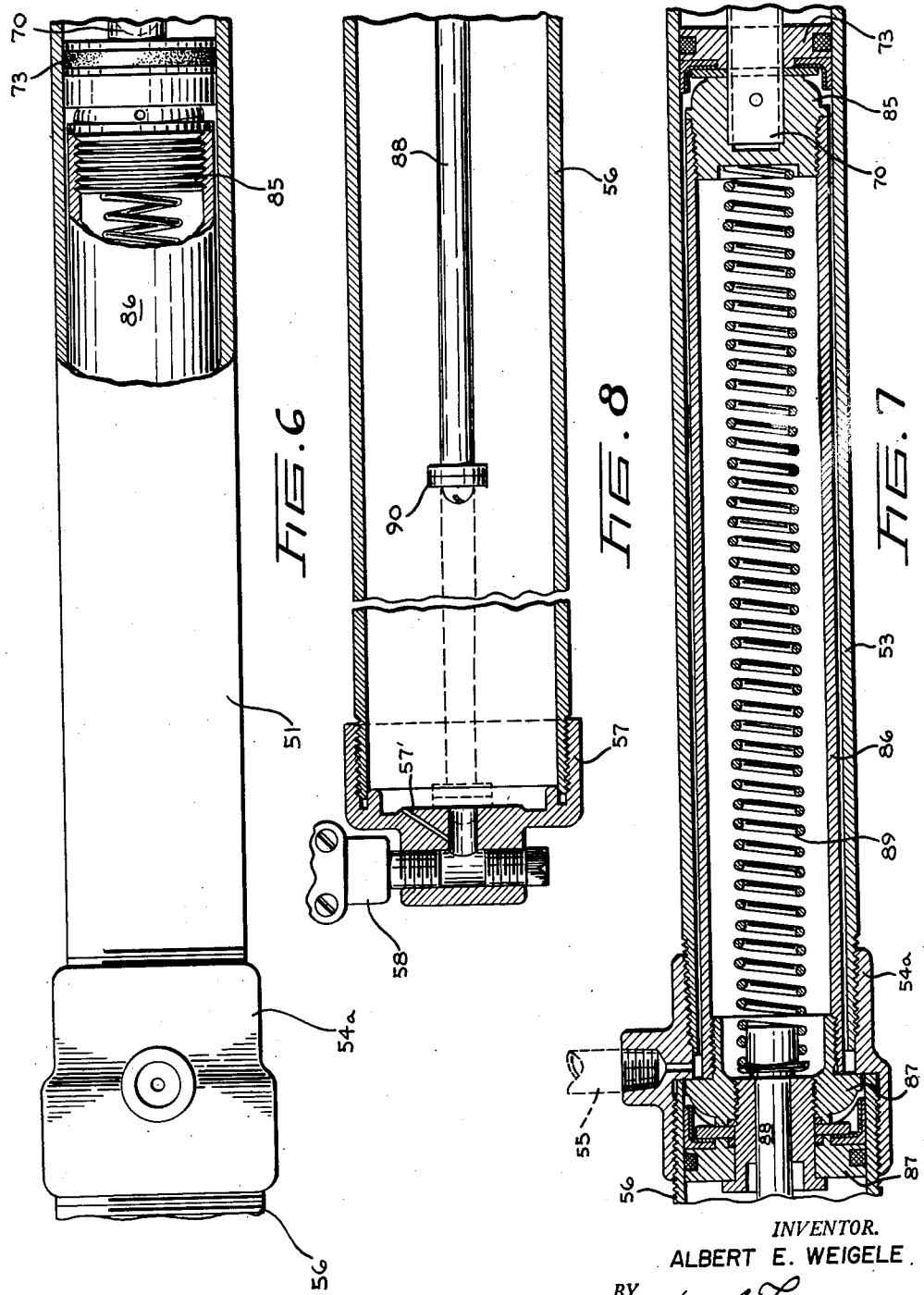

Oct. 7, 1952     A. E. WEIGELE     2,612,871
FLUID PRESSURE-OPERATED PISTON ASSEMBLY
Original Filed April 11, 1945     5 Sheets—Sheet 4
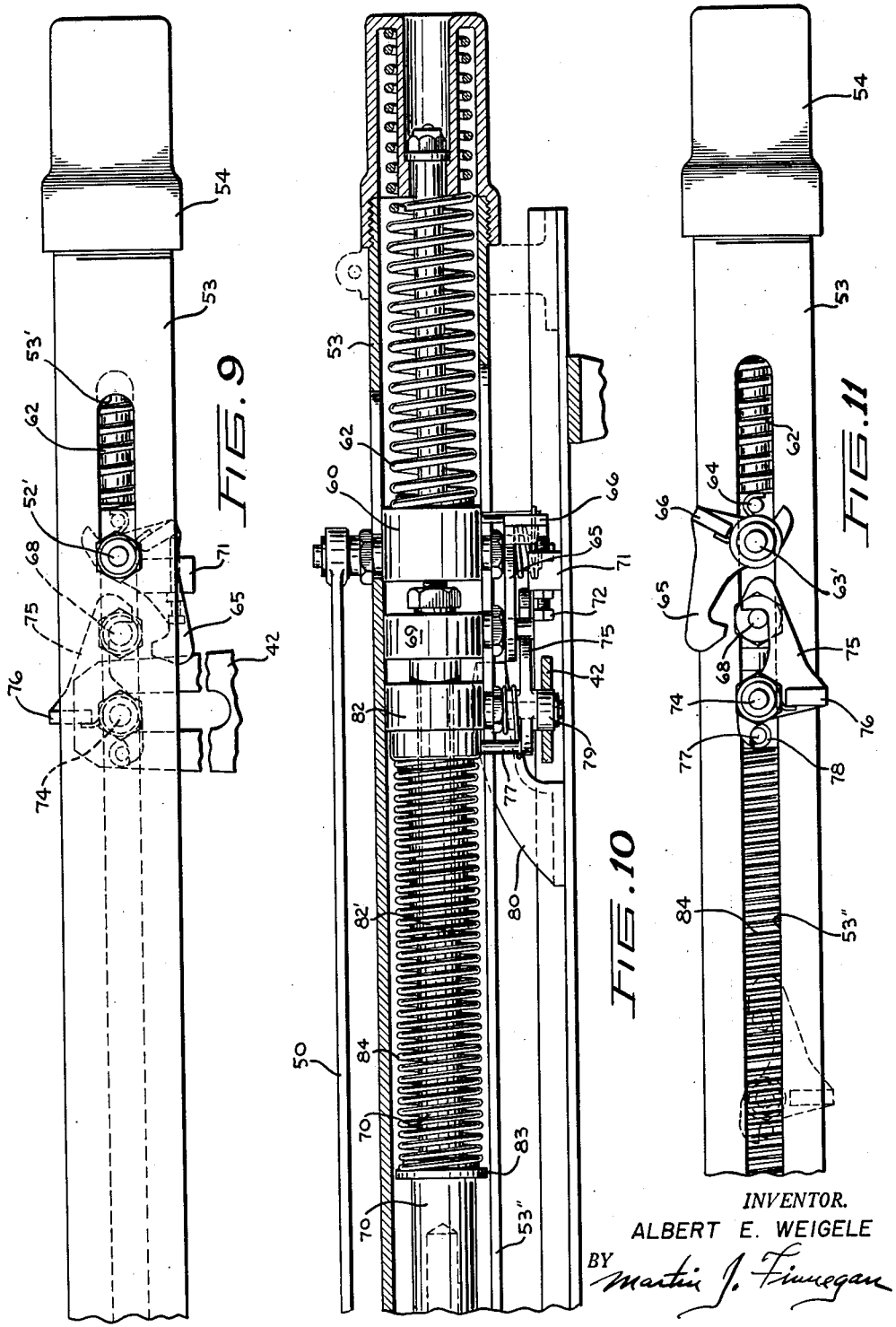
INVENTOR.
ALBERT E. WEIGELE
BY Martin J. Finnegan
ATTORNEY Oct. 7, 1952  A. E. WEIGELE  2,612,871
FLUID PRESSURE-OPERATED PISTON ASSEMBLY
Original Filed April 11, 1945　　5 Sheets-Sheet 5
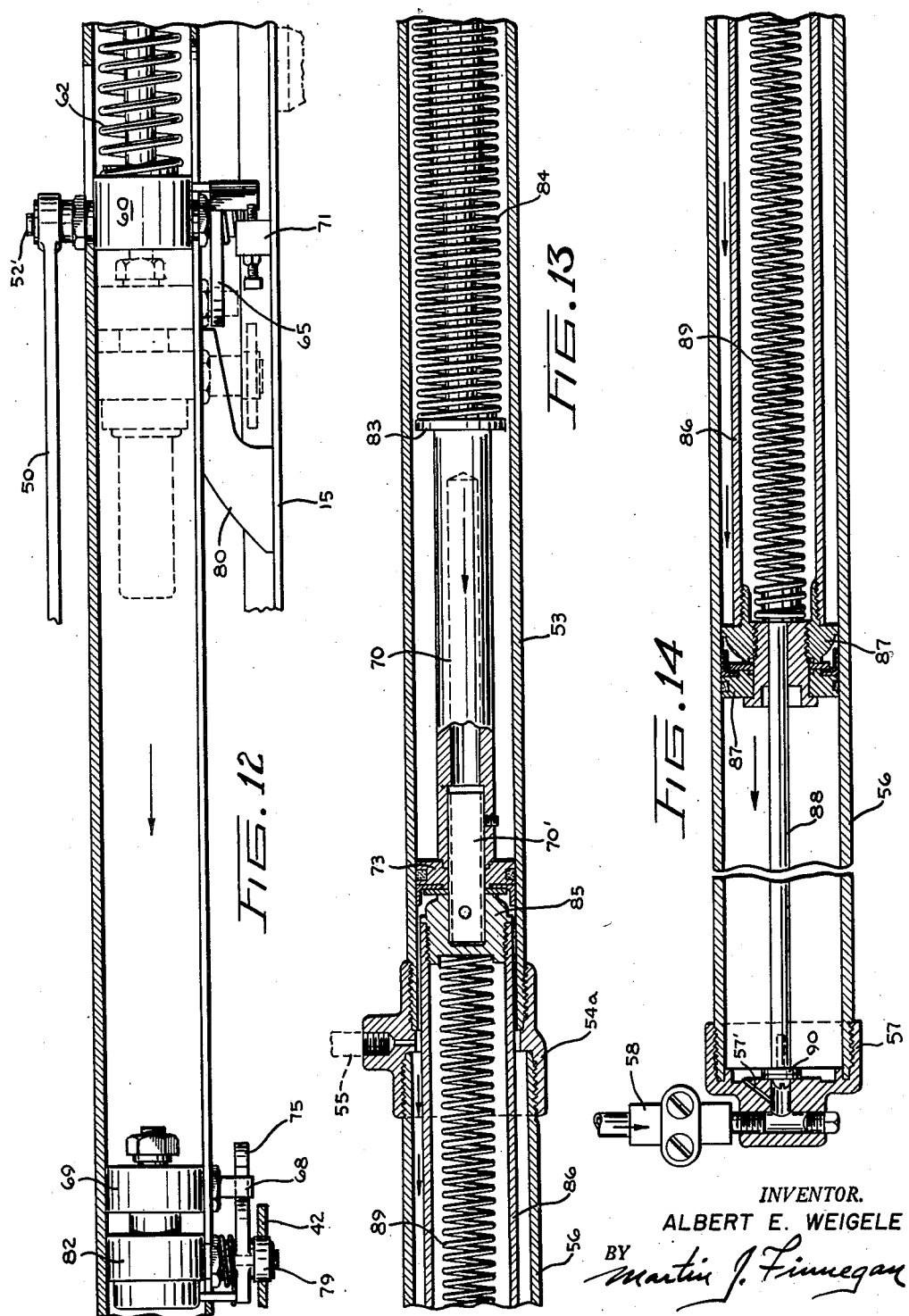
INVENTOR.
ALBERT E. WEIGELE
BY Martin J. Finnegan
ATTORNEY Patented Oct. 7, 1952

2,612,871

UNITED STATES PATENT OFFICE 2,612,871

FLUID PRESSURE-OPERATED PISTON ASSEMBLY

Albert E. Weigele, Irvington, N. J., assignor, by mesne assignments, to National Pneumatic Co., Inc., Boston, Mass., a corporation of Delaware Original application April 11, 1945, Serial No. 587,738. Divided and this application April 24, 1951, Serial No. 222,719

3 Claims. (Cl. 121—44)

1

This invention relates to fluid operated mechanism and particularly to mechanism embodying a power element of the non-cycling type.

An object of this invention is to provide in a power operating mechanism including a pair of reciprocable power elements, one in the nature of a fluid-actuated piston and the other in the nature of a plunger, novel means for interconnecting said two elements during a portion only of the complete piston stroke.

The foregoing discussion clearly indicates the general object of the invention. The more detailed objects involving the structural features herein disclosed will be apparent from the following description of the single embodiment of the invention illustrated in the attached drawings and defined in the appended claims.

This invention resides substantially in the combination, construction, arrangement and relative location of parts as will be described in detail below.

In the accompanying drawings in which the same reference numerals will be used throughout the various views to indicate the same parts, Fig. 1 is a top plan view of one end of air engine embodying the invention;

Fig. 2 is a bottom plan view of a portion of the engine structure of Fig. 1;

Fig. 3 is a vertical, longitudinal, cross-sectional view of the structure of Fig. 1;

Fig. 6 is a top plan view with some parts in cross-section of the next portion of the engine;

Fig. 7 is a vertical, central, longitudinal, cross-sectional view through the structure of Fig. 6;

Fig. 8 is a similar cross-sectional view of the next and terminal portion of the engine;

Fig. 9 is a bottom plan view of the end of the engine shown in Fig. 1;

Fig. 10 is a vertical, central, longitudinal, cross-sectional view through the portion of the engine shown in Fig. 9;

Fig. 11 is a bottom plan view of the portion of the engine shown in Fig. 9;

Fig. 12 is a vertical, central, longitudinal, cross-sectional view similar to that of Fig. 10 but showing the parts in door open position;

Fig. 13 is a vertical, central, longitudinal, cross-sectional view similar to that of Fig. 7 but including more of the next adjacent portion; and Fig. 14 is a vertical, central, cross-sectional view

2 of the final or terminal portion of the engine similar to Fig. 8 but showing the parts in door open position.

An engine of the character illustrated is particularly useful as an operating means for vehicle doors having a compound motion as they move from closed position to open position, as explained more fully in my Patent No. 2,552,356 granted May 8, 1951; the present application being a division of the application resulting in said patent. When applied to such a purpose, the apparatus functions to move the door in an angular path composed of two rectilinear motions; the piston and plunger being coupled during one stage of the movement, and uncoupled during the other stage.

Figure 4:
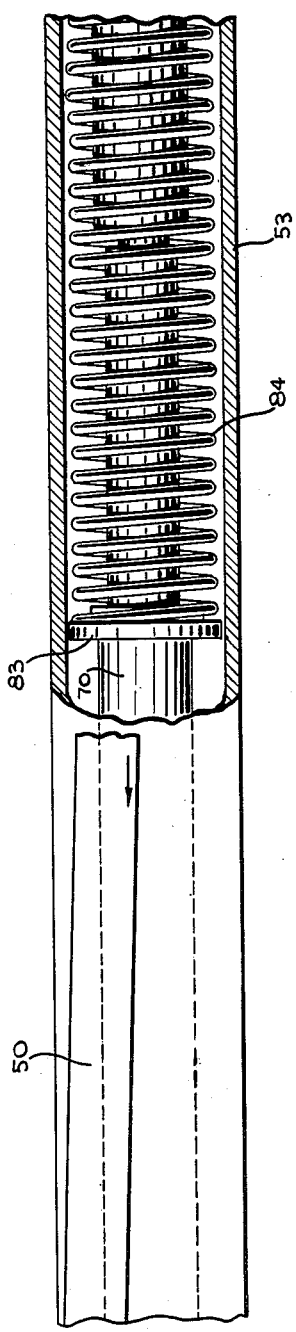
Fig. 4 is a top plan view partly in section of the portion of the engine next to the portion of Fig. 1.
Figure 5:
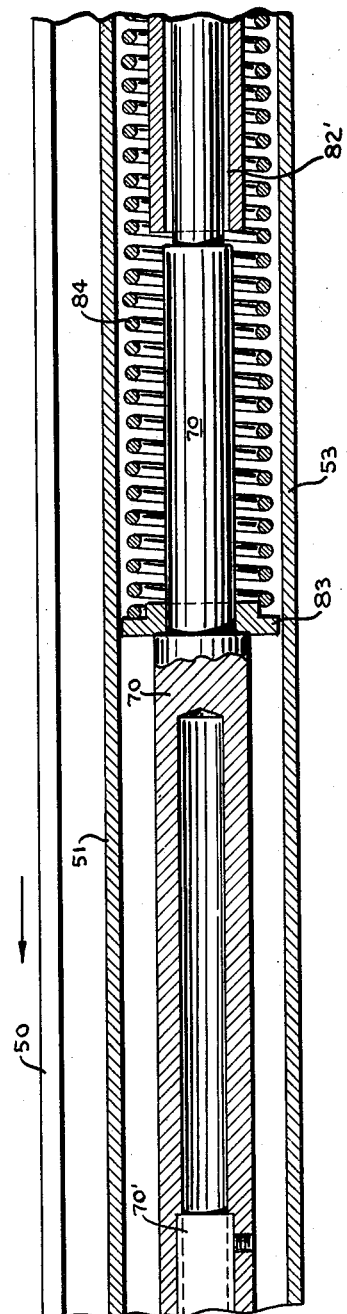
Fig. 5 is a vertical, central, longitudinal, cross-sectional view of the structure of Fig. 4.

The details of the engine are clearly shown in Figs. 1 to 14 inclusive.

A ram 60 is provided with a rod 61 which extends through a concentric opening in the reentrant tube 59 formed integrally with and concentrically of the end cap 54 which is threadedly connected to the end of the cylinder portion 53. A compression spring 62 lies between the ram 60 and the end wall of the cap 54. Ram 60 operates the door in one stage of its motion, through the intervening link 50, illustrated and described more fully in my Patent No. 2,552,356 above referred to. The cylinder portion 53 is provided with a relatively short longitudinal slot 53' in the wall at the top and in diametric relation with respect thereto is a much longer longitudinal slot 53''. The pivot pin 52' moves in the slot 53'. Mounted on the opposite side of the ram 60 is a pin 63' on which is pivotally mounted a latch 65. This latch is biased by means of a spring 63 having one end engaging a lateral lug 66 integral with the latch 65 (see Fig. 11) and the other end engaging a pin 64 mounted on the ram 60 (see particularly Fig. 3). The latch 65 has a rearwardly extending extension (see Fig. 11) for engagement with the pin 64 under the action of spring 63 to limit its movement to the position clearly shown in Fig. 2.

In this position of the lever 65 it engages or latches with a pin 68 mounted on the ram 69 slidably mounted in the cylinder portion 53. The ram 69 is mounted on a piston rod 70. Supported on the top side of the structural member 15 is a stop member 71 having an adjustable screw 72 mounted therein and positioned to engage the lateral extension 66 on the lever 65 near the end of its stroke towards the left (Fig. 3). As will be seen from Fig. 5, the piston rod 70 has portions of several different diameters and at the shoulder formed between a pair of these portions is a collar 83 against which one end of the compression spring 84 seats. The other end of this compression spring seats against a plunger 82 (see Fig. 3) through which the piston rod 70 freely passes. The plunger 82 has a tubular concentric extension 82' lying inside the spring 84 as a guide for it.

Mounted on the underside of the plunger 82 is a stud or pin 74 on which is pivotally mounted another latching member 75 biased by a spring 78 having one end anchored on a pin 77 mounted on the plunger 82 and the other end engaging a lateral extension 76 on the latch 75. As is clear from Fig. 1, for example, the latch 75 also has a rearwardly extending tail engageable with the pin 77 to limit its movement in a clockwise direction. A stop 80 is also mounted on the upper side of the plate 15 and provided with an adjustable set screw 81 to engage the lateral extension 76 of the latch 75 at the proper time to effect rotational movement of the latch 75. The pins and studs 63', 64, 68, 74 and 77 move in the slot 53'. Rotatably mounted on the lower end of the stud 74 is a roller 79 which engages in the slot of the arm 42, illustrated more fully in my Patent No. 2,552,356 above referred to, where it is shown attached to one of the sub-assemblies of the door track structure.

The piston rod 70 (Fig. 7) is connected to a piston assembly including the piston 73 by means of a tubular connecting member 70'. This piston is slidably mounted in the cylinder portion 53. A threaded cylinder plug member 85 forms part of this piston assembly and is threadedly connected to a tube 86 which in effect forms a continuation of the piston rod 70. A piston assembly 87 is attached to the other end of the tube 86 and operates in a cylinder portion 56 connected to the cylinder portion 53 by means of a properly constructed and threaded sleeve 54 (see Fig. 7). This sleeve is provided with a threaded port to receive the fluid pressure line 55, as will be described later. This is a good point to note that piston assembly 87 is of greater diameter than piston assembly 73 and hence the cylinder 56 is larger than the cylinder 53, a usual characteristic for a differential pressure fluid engine. Another characteristic is the fact that the piston assemblies 73 and 87 are rigidly secured together for conjoint movement.

Within the tube 86 (Fig. 6) is a compression spring seated at one end of the plug 85 and engaging it at its other end with a rod-like plunger 88 which is slidably mounted in the piston assembly 87 and projects towards the closure cap 57 (Fig. 8) for the other end of the cylinder portion 56. A pressure fluid supply connection 58 is provided for and attached to the cap 57. When the piston assembly 87 is moved sufficiently to the right (see Fig. 14, for example) so that the rod 88 is seated by the spring 89 on the piston assembly 87, the valve member 90 on the end of the rod 88 will move away from the port in the cap 57.

The above description comprises an explanation of the structural features of the mechanism comprising this invention and the operation thereof will now be given. It will be assumed that the movable parts of the engine 53 are all at the extreme right hand position, which is the position of the engine parts as shown in Figs. 3, 5, 7 and 8, for example. It will further be assumed that pressure fluid from a suitable source is supplied between the piston assemblies 73 and 87 through the pipe 55 (see Fig. 7) which, as is usual with differential engines, is a permanent connection, and that pressure fluid is also supplied to the left hand end of the large cylinder portion 56 through the connection 58 from the same source. In view of the fact that the pressure on both sides of the piston 87 is balanced the pressure on the piston 73 will have moved the engine parts to the extreme right hand position and the door is fully closed.

When the vehicle on which the engine is mounted comes to a stop, or at any time when it is desired to operate the engine, the operator by means of the usual valve, not shown, in the pipe connection 58 will disconnect that pipe from the pressure fluid source and open the pipe to exhaust. Thus the fluid in the cylinder portion 56 between the cap 57 and the piston assembly 87 will be exhausted. Since the pressure remains between the piston assemblies through the pipe connection 55, it will be seen that the piston assembly will begin to move to the left carrying the ram 60 with it since the piston rod 70 extends to the ram 69 and the ram 69 is latched to the ram 60 by means of the latch 65.

Upon the completion of this outward movement, the lateral extension 66 on the latch 65 will engage the said screw 72 (see Fig. 3) so that latch 65 is disengaged from the pin 68 as the movement of the plunger 60 is completed. At about this time the nut and collar on the end of rod 61 engages in the end of the reentrant tube 59 of the cap 54 to prevent any further movement of these connected parts under the action of spring 62. At the time latch 65 is disengaging the pin 68 latch 75 is engaging it. Some idea of this possibility will be gathered from Fig. 2 which shows the relationship of the parts just before latch 65 disengages and latch 75 engages. At about this time the ram 69 engages the right hand face of plunger 82 so that further movement of ram 69 will carry the plunger 82 with it. At this time ram 69 and plunger 82 are latched together by the latch 75 but this is of no significance at the moment. It will be seen from Fig. 2 that this latching movement is completed as the plunger 82 begins to move moving latch 75 with it and out of engagement with the set screw 81 so that it can move into this latching relationship.

It will be noted that when the piston assemblies move to the left to the point where the valve 90 seats on the cap 57 which is towards the end of the stroke of the engine, the remainder of its stroke will be cushioned by the fact that the remainder of the air in the cylinder is exhausted through a restricted port 57', as shown in Figs. 8 and 14, so as to cushion the final movement of the piston.

The operation of the apparatus in the return direction will be apparent from the foregoing description with the exception of a few details. To reverse the engine, the operator moves his control valve to again supply pressure fluid to the left hand end of the engine through the pipe connection 58 and air is supplied to balance the pressures on the larger piston assembly 87 so that piston assembly 85 takes over and moves the parts to the right. The pressure fluid can unseat the valve 90 sufficiently to accomplish this with the desired rapidity. During this period plungers 69 and 82 are latched together so that these parts move together until the lug 76 on the latch 75 engages the stop screw 81 (see Fig. 1) whereupon further movement will cause latch 75 to disengage from pin 68. At about the same time the ram 69 latches up with the ram 60 through the engagement of latch 65 with pin 68 and ram 69 which, of course, is connected to the connected piston assemblies 87 and 73 so that ram 60 is moved to the right.

The springs 62 and 84 are simply provided for the purpose of facilitating the movement of the elements by hand in the event that the power supply fails. If the left hand end of the engine is open to exhaust through pipe 58, the elements can be pushed out and then back by hand and in this manual operation the movement of the parts is aided by the forces exerted by springs 62 and 84 which are fully compressed so long as the fluid pressure is maintained.

From the above description, it will be apparent to those skilled in the art that the subject matter of this invention may be embodied in other physical forms and I do not, therefore, desire to be strictly limited to the disclosure as given herein for purposes of illustration but rather to the scope of the claims as granted.

What I claim is:

1. A motive device as described, comprising a cylinder, a piston assembly in said cylinder, a plunger slidably mounted in an extension of said cylinder having provision for connection to a device to be operated, a latch member for connecting said plunger to said piston assembly, a second plunger for connection to said device, and a second latching device connecting said second plunger to said piston assembly.

2. In the combination of claim 1, means for unlatching said second plunger from said piston assembly at a predetermined point in the stroke thereof.

3. In the combination of claim 1, means for unlatching said second plunger from said piston assembly at a predetermined point in the stroke thereof, said first unlatching means disconnecting the first plunger from the piston assembly substantially at the time said second latching means connects the second plunger to said piston assembly.

ALBERT E. WEIGELE.

REFERENCES CITED

The following references are of record in the file of this patent:

UNITED STATES PATENTS

| Number | Name | Date |
| --- | --- | --- |
| 270,760 | Dederick | Jan. 16, 1883 |
| 1,865,105 | Houplain | June 28, 1932 |
| 2,019,617 | Maybach | Nov. 5, 1935 |